United States Patent [19]

Kuhlmann et al.

[11] 4,122,753

[45] Oct. 31, 1978

[54] EXPANSION ANCHOR ASSEMBLY INCLUDING AN INTERCONNECTING DEVICE

[75] Inventors: Wolf Kuhlmann, München; Gerhard Rumpp, Inning; Albert Busler, Altmuhldorf, all of Germany

[73] Assignee: Hilti Aktiengesellschaft, Schaan, Liechtenstein

[21] Appl. No.: 714,334

[22] Filed: Aug. 13, 1976

[30] Foreign Application Priority Data

Aug. 13, 1975 [DE] Fed. Rep. of Germany ....... 2536136

[51] Int. Cl.$^2$ .................... F16B 13/06; F16B 31/02
[52] U.S. Cl. ........................................ 85/74; 85/62
[58] Field of Search ............... 85/74, 75, 76, 72, 62, 85/67, 61

[56] References Cited

U.S. PATENT DOCUMENTS

| 2,824,481 | 2/1958 | Johnson | 85/62 |
| 3,227,031 | 1/1966 | Williams | 85/75 X |
| 3,937,123 | 2/1976 | Matuschek | 85/62 X |

Primary Examiner—Ramon S. Britts
Attorney, Agent, or Firm—Toren, McGeady and Stanger

[57] ABSTRACT

In a straddling dowel or expansion anchor assembly, a threaded bolt or stud has a head or nut adjacent one end for securing a member onto a support structure. The bolt is threaded into one end of a sleeve-like member and a threaded projection extends axially from the other end of the member with the projection extending axially through an expansion sleeve. A spreader is threaded onto the outer end of the projection for use in expanding the expansion sleeve. A device interconnects the bolt or stud and the sleeve-like member so that rotation of the bolt is transmitted to the sleeve-like member for pulling the spreader into and expanding the expansion sleeve. When a minimum anchoring value of the anchor within a borehole is achieved, the interconnection is disengaged. By continued rotation of the bolt or stud the member can be secured to the support structure with the interconnecting device being completely enclosed within the anchor structure.

40 Claims, 7 Drawing Figures

EXPANSION ANCHOR ASSEMBLY INCLUDING AN INTERCONNECTING DEVICE

SUMMARY OF THE INVENTION

The present invention is directed to a straddling dowel or expansion anchor assembly used in securing a member onto a support structure, a threaded bolt or stud provides the connection of the member to the structure and it is threaded to one end of a sleeve-like member while a threaded projection extends axially from the other end of the sleeve-like member through an expansion sleeve which can be expanded outwardly by a spreader threaded onto the projection. More particularly, the invention is directed to an arrangement for interconnecting the bolt and the sleeve-like member so that the bolt can rotate the sleeve-like member until a minimum anchoring value is obtained at which point the interconnection is automatically disengaged permitting further rotation of the bolt without rotation of the sleeve-like member.

Straddling dowels or expansion anchors with a bolt-type fastening element and spreader are widely used with the spreader serving to widen an expansion sleeve. To widen the expansion sleeve, the spreader is axially displaced relative to the sleeve. The axial displacement is usually effected by a threaded connection existing between the fastening element and the spreader. For applying the torque, the fastening element usually has a head at its end which is used in attaching a load to a support structure with the head projecting laterally outwardly from the adjacent body of the expansion anchor. The head on the fastening element serves both as an abutment for generating axial forces during the expanding operation and also for bearing on the parts to be attached by the anchor to a support structure.

Such known expansion anchors are highly suitable for applications where the setting depth is exactly determined, however, they are less suitable in cases where the setting depth must be adapted to external influences.

These known dowels are particularly unsuitable when the dowel must be anchored in a first phase into the support structure with the part or member to be attached to the structure being fixed subsequently. For such applications expansion anchors or straddling dowels are known which include an expansion sleeve and a spreader threaded on a fastening element extending through the sleeve.

In addition to a stop for the expanding element, the fastening element of these anchors has another displaceable stop, for example, in the form of a polygonal nut threaded on the element. Thus, it is possible for an anchor to be secured in the support structure during a first phase by means of surfaces arranged on the fastening element, and then for the part to be fixed to the support structure being tightened into engagement with it by the nut acting as a stop.

In this known dowel there is the disadvantage that different tools must be used in the various thread tightening operations. This requirement is uneconomical, particularly because of the time involved. In addition, problems develop in the successive spreading operations which are independent of one another. Since these independent operations are not adapted to one another, there is a risk that the anchor will either not attain the required extraction values or will be overstressed during the setting operation.

Another known anchor of the type in question has a fastening element in the form of a threaded bolt in its load attaching range. This part of the fastening element is provided with a cap nut. The cover disc of this cap nut establishes with the fastening element, a torque-locking connection so that a torque acting on the cap nut is also transmitted to the fastening element which is in threaded engagement with the spreader. The cap nut is dimensioned in this dowel so that the cover disc can be torn off under a certain load, and the torque locking connection with the fastening element is disengaged after the cover disc is torn off. The size of the load under which the cover disc is torn off, that is, under which the torque locking connection between the cap nut and fastening element is automatically disengaged, can be selected depending on the application of the expansion anchor. In any case, it must be selected so that the connection is disengaged only when the anchoring values for the respective case have been attained, that is, at the time when the friction between the expansion sleeve and the borehole wall in the supporting structure is so great that the expansion sleeve is locked under the load applied, and an additional movement after spreading can only be achieved by an additional slight displacement of the spreader. In the present case these anchoring values are referred to as "minimum anchoring values."

After the cover disc has been torn off, the cap nut functions merely as a normal nut which permits the load being attached to the support structure, to be tightly pressed against the structure.

Such a cap nut used in the known dowel is an expensive special part which must be separately machined because of its preset breaking point. A disadvantage of such a member is that the breaking point is not covered on the exterior so that loose parts can be displaced under certain circumstances when the cover disc is torn off which can lead to injuries. The breaking point exposed to the exterior can also cause accidents after the anchor is secured in place, due to its sharp-edged parts. In addition to this disadvantage, the exposed breaking off region is also unsightly and subject to considerable corrosion.

The object of the present invention is to provide an anchor which insures an optimal and controllable setting quality while avoiding any of the above mentioned disadvantages.

Therefore, in accordance with the present invention, a straddling dowel or expansion anchor of the above described type is provided with a connecting device between the shoulder of the bolt or stud which fastens the load to the support structure and the trailing end of the expansion sleeve and the connecting device is automatically disengageable when a minimum anchoring value has been obtained. With the connecting device disengaged, the bolt can secure the load or member to the support structure without axial displacement of the member to which it was connected. Further, when the member is secured to the support structure, the connecting device is completely enclosed within the expansion anchor or within the supporting structure or it is enclosed by the member attached to the supporting structure.

In accordance with the present invention, the bolt provides a first threaded part and the member to which it is connected provides a second threaded part which are connected together via an automatically disengageable connecting device. When the anchor is set in the support structure and the member being attached is secured to the structure, the connecting device is completely covered from the exterior of the anchor. Various parts can be used to provide the covering for the device, however, preferably the anchor itself provides the covering through the member attached to the support structure or the support structure itself can also be used for this purpose. The covering or enclosure for the connecting device can be provided by any one of the above-mentioned elements or by a combination of them. This arrangement ensures that the connecting device is protected against corrosion and there is no danger of injuries from flying or projecting parts.

In addition to the first and second threaded parts, there is a third threaded part projecting from the second part to which the spreader is secured and all of these parts can have male threads, female threads, or male and female threads. Furthermore, the first, second and third threaded parts can also be connected to one another by additional intermediate threaded parts. As indicated above, the first threaded part is preferably the part or bolt which serves to secure the member to the support structure. The expansion anchor is always designed so that it rests firmly in the support structure, even after the threaded part which secures the member to the support structure has been unscrewed. This can be achieved with the expanding cone or spreader, the expansion sleeve and an additional threaded part, preferably the second threaded part, being connected to one another, regardless of the threaded part used for attaching the member to the support structure. Instead of this arrangement, the cone-shaped surfaces of the spreader and/or the expansion sleeve can be selected with a flat configuration so that self-locking occurs between the spreader and expansion sleeve once the expansion sleeve has been spread.

Normally, the disengageable connecting device is supported between the bolt or first threaded part and the fastening element or second threaded part or the expansion sleeve. If a certain additional initial support is ensured at the commencement of the expansion process between the washer which limits the depth of insertion of the anchor assembly and the other part of the anchor extending toward the expansion sleeve, the device can also be positioned between the first part and the washer, after the expansion sleeve has been set in the borehole or opening in the supporting structure.

Preferably a stop yieldable under a predetermined force is provided at least on one of the first and second threaded parts or on the expansion sleeve for providing the connecting device between the first and second parts so that they rotate together, which device is disengaged when a minimum anchoring value is attained.

While protrusions, projections and the like are particularly suitable for such a connection, as far as load limits are concerned, other means could be employed, such as soldered, welded or cemented joints between the first and second threaded parts or between the first threaded part and the expansion sleeve, which joints could be used for economical reasons. Since these joints, which disengage under a predetermined load, depend to a considerable extent on external influences, a certain difference in the way the device acts could occur using these different types of joints.

In accordance with one embodiment of the invention, the first threaded part can be a threaded bolt which is connected over a threaded connection within a sleeve-like threaded part serving as the second threaded part with the device providing the torque-locking connection between the two parts which disengages when a minimum anchoring value is reached, being positioned within and extending across the interior of the threaded part of the sleeve-like member. Instead of a threaded connection between the two parts, a connecting device similar to a bayonet lock could be used.

In another embodiment, the disengageable connecting device can be incorporated into a one or multiple part sleeve bearing in the axial direction on the second threaded part. The first threaded part can be a threaded bolt which is connected within a sleeve-like portion of the second threaded part. Further, the first threaded part can also be a threaded stud with a conventional nut with the threaded stud screwed into a sleeve-like portion in the second threaded part. Further, the second threaded part having a sleeve-like portion can have an axially extending threaded projection on its first or leading end or a conventional threaded rod can be introduced into the threaded sleeve-like portion of the second threaded part. As a support for the connecting device either the head of the bolt or the nut can be used and one or several sleeves can be arranged between the head or nut and the connecting device for bridging the distance in between.

As mentioned above, the disengageable connecting device can be designed in a number of ways. It is particularly desirable in such a device which disengages at determinable force levels, for an operator to be able to check whether disengagement has taken place by either visual or acoustical means. For example, as the connecting device, a pin traversing the sleeve-like portion of the second part can be used with a preset breaking point provided in the pin. In another arrangement, the connecting device can be provided as a projection, for example, in the form of studs, knobs, beads, collars and the like. The production of such devices, such as on the second threaded part, can be effected in a known manner by forming the projections on the exterior of the part. Still another type of connecting devices which can be used are thrust washers which are arranged in frictional contact within the sleeve-like portion of the second threaded part or fastening element with the first threaded part. Connecting devices in the form of spring elements or as compressible or otherwise deformable elements requires no special machining in the cooperating parts. While spring elements can be designed, for example, in the form of annular springs or spring washers, metal or plastic objects, which bear on the bottom of the sleeve-like portion of the second threaded part are suitable as compressible elements if the second part has a female thread within the sleeve-like portion.

An essential advantage of the expansion anchor in accordance with the present invention, is that it can be anchored at any desired setting depth within an opening or borehole without bearing on the load or member to be secured to the supporting structure. The anchoring action is achieved in the first spreading phase, that is, before the connection between the first part or entraining means and the second part or fastening element is disengaged. After the device which provides the rotation of the fastening element as the entraining means is rotated, is disengaged, the second spreading action automatically comes into play on further tightening of the first part which serves, in particular, to secure the member to be fastened to the supporting structure and also results in an additional component used for spreading. Since the distance required to be traversed in clamping the member to be fastened must be absorbed within the expansion anchor, and preferably by screwing its individual threaded parts together, after the connecting device is disengaged, the relative dimensions of the axial displaceability of the threaded parts with respect to one another is the determining factor in the selection of the size of such distance. To determine the axial distance to be traversed, the expansion anchor or dowel, in accordance with the present invention, preferably has a spacer element in the range in which it fastens the member to the support structure, which element yields at the latest when the connecting device between the first and second threaded parts has been disengaged. The spacer element has no effect on the anchoring character of the anchor or dowel, and facilitates merely the selection of the optimum setting depth. This spacer element does not have to meet any special strength requirements. The force under which it yields must be selected merely so that the spacer element does not yield even when the anchor is set under difficult conditions, that is, when it is driven into the borehole or opening in the support structure by means of a hammer.

With this suggested spacer element there results a properly dimensioned path for disengaging the torque-transmitting connection between the first and second threaded parts after the minimum anchoring value has been reached. As soon as the spacing distance has been eliminated, there is the assurance that the connecting device has been disengaged and the anchor has achieved the desired anchoring values. The elimination of the distance permits a visual inspection which indicates when the anchor has been adequately set.

This spacing distance can also be produced by an incomplete insertion of the anchor into a receiving bore. The disadvantage in producing such a spacing distance lies, however, in the required subjective evaluation by the operator which may result in an error in judgment of the correct distance.

Preferably, the spacer element is a washer with a spacer sleeve extending between the washer and a stop or shoulder on the bolt or entraining means, with the sleeve being displaceable relative to the washer under a predetermined load. Such load should only be such that the forces, produced when the anchor is inserted into the borehole, can be absorbed. While the washer serves as a boring surface forcing the member to be secured against the supporting structure, the spacer sleeve can be pushed through the washer when the connecting device between the first and second threaded parts is disengaged.

Since the elimination of the distance between the head or shoulder on the first threaded part and the washer that is the axial length of the spacer sleeve from the washer to the shoulder, serves to provide a visual indication of the anchoring values obtained and the spacer sleeve can preferably be provided with a conspicuous color scheme. This considerably facilitates the control of the setting quality of the expansion anchor.

For supporting the specer element, a distance sleeve formed of a deformable material is preferable. Such a distance sleeve can be constructed of plastic or sheet metal. To facilitate the deformation of the plastic distance sleeve, for example, it can be provided with recesses. Another possibility is to configure the distance sleeve so that the spacer sleeve can be telescoped into it.

In another preferred embodiment of the invention, the disengageable connecting device can be used to support the spacer element. In such an arrangement the connecting device is formed as a collar on a ring-shaped member connected to the spacer element. A part of the spacer element, that is, a spacer sleeve, can serve the additional function of transmitting the force from the bolt or entraining means to the connecting device.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 2:
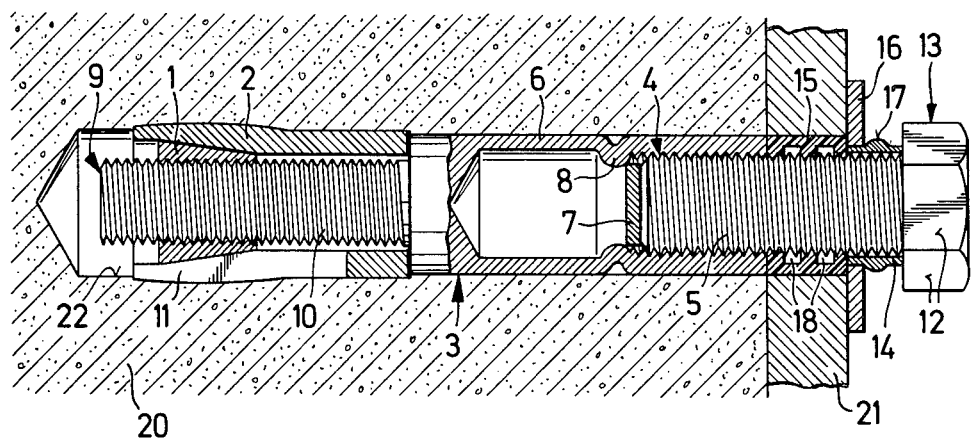
FIG. 2 is a view similar to FIG. 1, however, showing the expansion anchor assembly inserted into a borehole with the first phase of the anchoring operation being completed.

In the description of the various embodiments certain parts of the expansion anchor assemblies are described as having a first end and a second end, the first end is that end which faces in the leading end of the assembly, that is, the end which is first inserted into a borehole, note FIG. 2. The second end is that end which faces in the other direction. In other words, the various axially extending parts of the expansion anchor assemblies have a first or leading end and a second or trailing end disposed in the same relationship as the leading and trailing ends of the overall expansion anchor assemblies as shown in the drawing.

Figure 1:
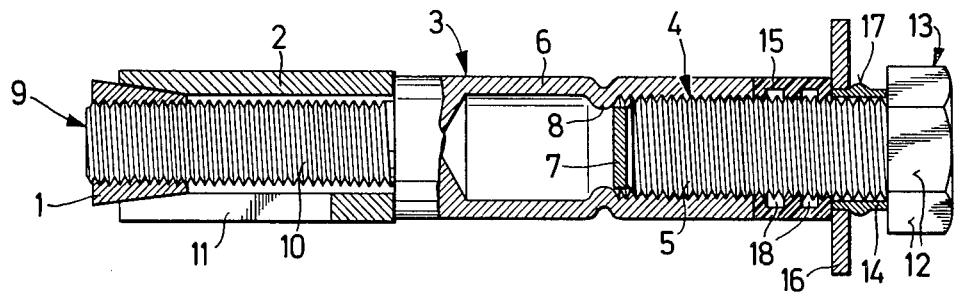
FIG. 1 is an axially extending view, partly in section, illustrating an expansion anchor assembly, in accordance with the present invention, ready to be inserted.

In FIG. 1 the illustrated expansion anchor assembly consists of a spreader 1 fitted into the first end of an expanding sleeve 2 with a fastening element 3 contacting the second end of the expanding sleeve. A threaded bolt 4 extends into a sleeve-like portion in the second end of the fastening element and is connected to the sleeve-like portion by means of a thread 5. For limiting the axial displacement of the bolt 4 relative to the fastening element 3 an inwardly projecting annularly shaped bead 8 is provided around the inside surface of the fastening element and acts as a stop against which a disc 7 bears. The disc 7 and the bead 8 combine to provide a disengageable connecting device which couples the bolt to the fastening element so that rotation of the bolt effects the rotation of the fastening element. Extending axially forwardly from the first end of the fastening element is a lug or projection 9 having a thread 10. Spreader 1 is disposed in threaded engagement with the first end of the projection 9 so that its frusto-conical surfaces are held in contact with the correspondingly shaped frusto-conical surfaces at the first end of the expansion sleeve 2. The expanding sleeve is widened when the spreader 1 is pulled into it and it has one or a number of elongated slots 11 which facilitate the radial expansion of the sleeve.

The bolt 4 has a head 13 located on its second end with the head projecting laterally outwardly from the bolt and having working surfaces 12 around its sides. Between the head 13 and the second end of the sleeve-like portion 6 of the fastening element 3 there is arranged a spacer sleeve 14 and a distance sleeve 15. These two sleeves are disposed in serial arrangement with the spacer sleeve 14 extending from the head 13 followed by the distance sleeve 15 which extends into contact with the second end of the fastening element 3. Mounted on the outer surface of the spacer sleeve 14 is a washer 16 which is positioned between the second end of the distance sleeve 15 and an annular collar 17 projecting outwardly from the outer surface of the spacer sleeve and located intermediate its first and second ends. Distance sleeve 15 is made of plastic and is provided with annular recesses 18 in its inner surface which facilitate the deformation of the sleeve.

Figure 3:
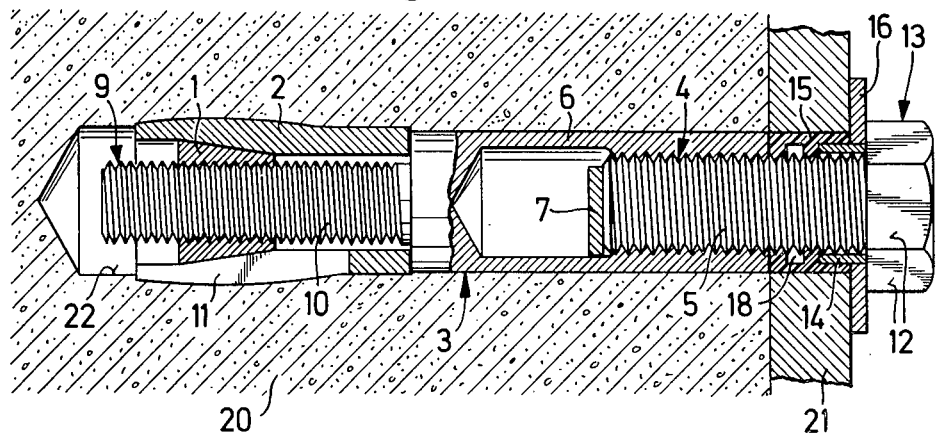
FIG. 3 is a view similar to FIG. 2, but with the setting of the expansion assembly completed.

FIGS. 2 and 3 show different steps or phases in the setting of the expansion anchor assembly within a borehole in a support structure 20 with a load or member 21 positioned between the washer 16 and the surface of the supporting structure for securement to the structure by means of the head 13 on the bolt and the washer 16.

FIG. 2 represents the work performed by the expansion anchor assembly up to the point of disengagement of the torque-locking connection device provided by the members 7, 8 located between the sleeve-type portion 6 of the fastening element 3 and the bolt 4. To reach the state shown in FIG. 2, after the expansion anchor assembly has been inserted into the bore 22 of the support structure 20, the head 13 is rotated applying a corresponding torque to the entire fastening element 3 which is similarly rotated relative to the expansion sleeve 2 due to the bracing action acting on the expansion sleeve. As the fastening element 3 rotates, its threaded projection 9 pulls the spreader 1 into the expansion sleeve causing the sleeve to expand radially outwardly into locking engagement with the surface of the borehole 22. During this phase of the anchoring operation, no axial force has yet been exerted on the member 21, if we disregard the force with which the washer 16 acts against the member 21 when the assembly is inserted into the borehole.

After the minimum anchoring value has been reached with a sufficient expansion of the sleeve 2 due to the torque applied to the head 13 of the bolt 4, disc 7 is driven through the reduced cross section of the sleeve-like portion 6 of the fastening element 3 provided by the inwardly projecting torus 8, because the axially applied load on the disc and the torus increases with increasing expansion and requires an increased torque for rotating or turning the bolt. With the disc 7 displaced forwardly through the torus, the torque locking connection between the bolt or entraining means and the fastening element is disengaged. In this phase, bolt 4 is threaded into the sleeve-like portion 6 of the fastening element 3 and this axial movement is effected by pressing the spacer sleeve 14 through the opening in the washer 16. It can be noted that there is an annular open space between the hole in the washer and the outer surface of the bolt. Collar 17 projecting outwardly from the spacer sleeve serves as a stop which is deformed or sheared off as the sleeve 14 is moved relative to the washer 16. The end of the spacer sleeve passing through the washer can penetrate without too much resistance into the interior surface of the distance sleeve 15 with the deformation of those parts of the distance sleeve which define the recesses 18. As the sleeve 14 is pressed through the washer 16, the head 13 of the bolt acting as a stop bears directly on the surface of the member 21 with the interposition of the washer 16 between the head 13 and the member 21, note FIG. 3.

A torque applied to the head 13 in this position of the anchor assembly has the result that, on one end, the member 21 is pressed tightly against the support structure 20, and on the other hand, an additional expanding force is applied by purely axial forces driving spreader 1 further into expansion sleeve 2.

As can be seen in particular from FIGS. 2 and 3, the anchoring of the expansion anchor assembly is only completed when there is no interval or spacing left between head 13 of the bolt and the surface of the washer 16. This characteristic can be utilized as a visual indication that sufficient anchoring has been achieved by noting the presence or absence of the spacer sleeve 14 which can be provided with a conspicuous color scheme. When the spacer sleeve can no longer be seen, that is, when it is completely covered by the head of the bolt and the washer, then the anchoring action has been completed.

Figure 4:
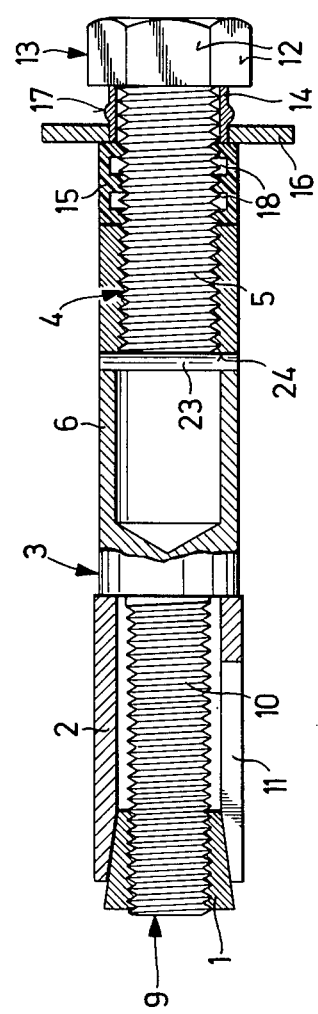
FIG. 4 is an axially extending view, partly in section, similar to the view shown in FIG. 1, of an expansion anchor assembly embodying the present invention with the assembly ready to be inserted.

FIG. 4 illustrates another embodiment of an expansion anchor assembly which differs from the arrangement shown in FIG. 1 merely by the fact that a pin 23 is used as the torque-locking connection device between the bolt 4 and the sleeve-like portion 6 of the fastening element 3. The pin 23 is mounted in a through bore 24 in the sleeve-like portion 6. The arrangement and function of all of the other parts of the assembly correspond to the description set forth above.

Figure 5:
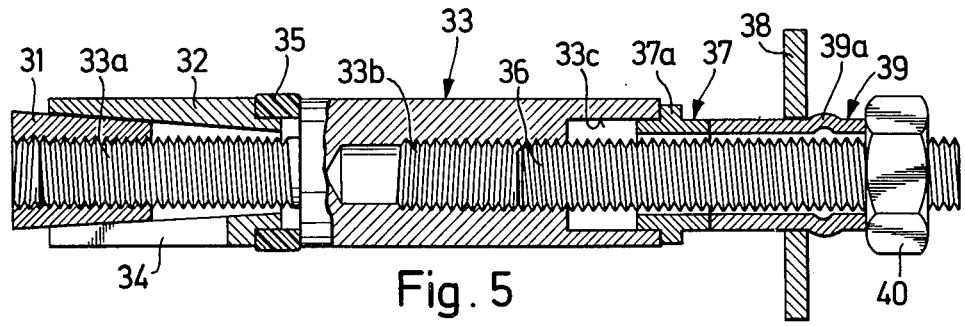
FIG. 5 is a view similar to that shown in FIGS. 1 and 4 of an expansion anchor assembly embodying the present invention and with the assembly ready to be inserted.

FIG. 5 exhibits another embodiment of an expansion anchor assembly in accordance with the present invention. The anchor consists of a spreader 31 fitted into the first end of a sleeve 32 and a fastening element 33 extending axially rearwardly from the second end of the expansion sleeve.

Extending axially outwardly from the first end of the fastening element 33 is a threaded lug or projection 33a onto which the spreader 31 is threaded. Expansion sleeve 32 has one or more axially elongated slots 34 for facilitating the expanding action on the sleeve.

For retaining the anchor assembly in the borehole until it is secured by the expanding action, and to prevent the rotation of the expansion sleeve 32 and of the spreader 31 during the expanding step, an elastic locking element 35, preferably made of plastic, is arranged between the first end of the fastening element 33 and the second end of the expansion sleeve 32.

An axially elongated stud 36 is threaded into a female thread 33b formed on the interior surface of a bore or sleeve-like portion of fastening element 33. Arranged in series on the stud 36 extending from the second end of the fastening element 33, is a sleeve 37 and a spacer sleeve 39 with a washer 38 laterally enclosing the spacer sleeve at a point intermediate its first and second ends. A hexagonal nut 40 is threaded onto the second end of the stud 36 and acts as an entraining means for anchoring the assembly. On the radially outer surface of the sleeve 37 is a stop 37a formed as an annular collar and the stop bears against the second end of the fastening element 33. The portion of the sleeve 37 extending forwardly from the stop 37a to its first end is fitted within a counterbore 33c formed in the second end of the fastening element with the counterbore extending rearwardly from the threaded bore within the fastening element. On the radially outer surface of the spacer sleeve 39 is an annular bead 39a which maintains the washer 38 in spaced relation from the nut or entraining means 40 and assures a certain spacing between these two parts when the anchor assembly is ready to be inserted into a borehole or the like. When the assembly is being set, it is pushed through the opening provided in the member 43 into the borehole 41 until the washer 38 bears on the surface of the member to be secured to the supporting structure 42, note FIG. 6.

Figure 6:
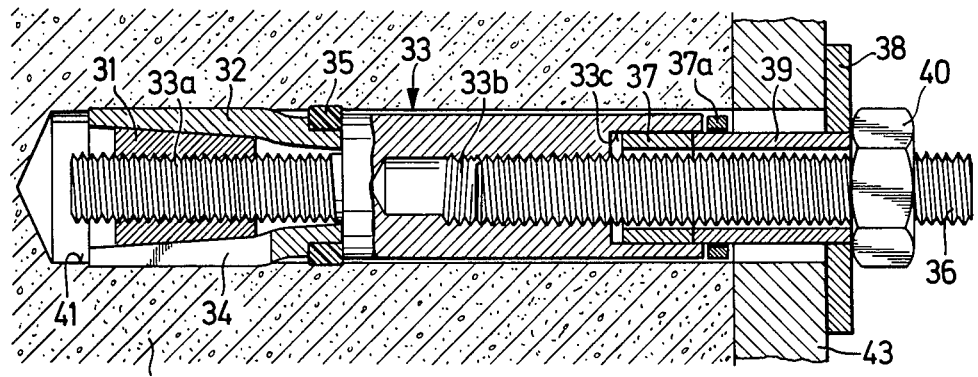
FIG. 6 is a view of the dowel shown in FIG. 5 with the first phase of the insertion of the expansion anchor assembly completed.

FIG. 6 shows the expansion anchor assembly illustrated in FIG. 5 after the expanding action has been completed. By turning the nut 40 about the axis of the stud 36, fastening element 33 is rotated by the disengageable connecting device afforded by the combination of the spacer sleeve 39 and the sleeve 37. The stop 37a extending outwardly from the sleeve 37 bears on the second end of the fastening element 33 and serves as a driving member. As the projection 33a is rotated, the non-rotating spreader is pulled into the expansion sleeve, widening it laterally outwardly into locking engagement with the surface of the borehole 41 in the supporting structure 42. During the expansion of the sleeve 32, the fastening element 33 moves axially into the borehole 41 and causes the deformation of the elastic locking element 35. This deformation prevents the member being secured to the supporting structure from being clamped on the end of the fastening element instead of on the supporting structure.

The axial forces acting on the stop 37a due to the transmission of the torque, increase constantly with the increasing anchoring action effected within the borehole 41, however, at this point there is still no defined pressure exerted by the assembly on the member 43 to be secured to the supporting structure. The dimensions of the stop 37a are selected so that it is sheared off when the required minimum anchoring value has been attained in the borehole. Accordingly, with the stop 37a removed, the sleeve penetrates into the counterbore 33c because it no longer encounters any resistance to such movement. Therefore, the rotational engagement between the entraining means or nut 40 in the fastening element 33 is disengaged. Sleeve 37 followed by spacer sleeve 39 are forced into the second end of the fastening element in a telescoping fashion after the bead 39a has been displaced through the opening in the washer 38. When the nut 40 contacts the surface of the member 43 it can secure the member to the supporting structure by further threading the nut on the stud 36.

At its second end, the threaded stud 36 can be provided with means for rotational entrainment, such as a hexagonal recess, a screwdriver slot or the like, so that it is possible to thread the stud even deeper into the fastening element before the member 43 is fastened in place. Fastening element 33 and threaded stud 36 can be non-rotatably connected together or they can be formed as an integral member.

Figure 7:
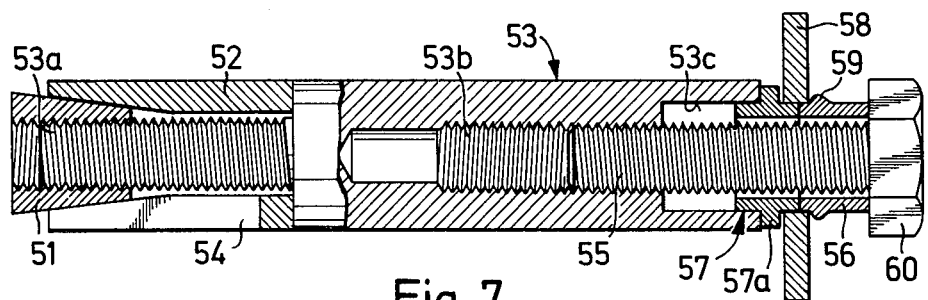
FIG. 7 is another embodiment of an expansion anchor assembly in accordance with the present invention designed as an internally threaded anchor shown ready to be inserted.

FIG. 7 shows another variation of the expansion anchor assembly of the present invention. The assembly consists of a spreader 51 fitted into the first end of an expansion sleeve 52 with a fastening element 53 in contact with and extending axially from the second end of the expansion sleeve. The first end of the fastening element 53 has an axially extending threaded lug or projection 53a onto which the spreader 51 is threaded so that the spreader is moved or pulled into the expansion sleeve as the fastening element 53 is rotated. To facilitate the axial expansion of the sleeve 52 it is provided with one or more elongated slots 54.

A threaded bolt 55 is screwed into a female thread 53b formed in the surface of a bore or sleeve-like portion of the fastening element. Located at the second end of the bolt is a spacer sleeve 56 and another sleeve 57 extends from the first end of the spacer sleeve 56 into the counterbore 53c formed in the second end of the fastening element. Projecting outwardly from the outer surface of sleeve 57 is an integral stop 57a which is designed as an annular collar and bears on the second end of the fastening element 53. A washer 58 is positioned on the outer surfaces of the spacer sleeve 56 and the adjacent sleeve 57 in the space between the stop 57a and an annular projection 59 extending outwardly from the surface of the spacer sleeve. The method of inserting and securing the expansion anchor assembly of FIG. 7 corresponds to that of the embodiment represented in FIGS. 5 and 6. The hexagonal head 60 on the bolt 55 serves during the tightening or anchoring action as an entrainment means. When the necessary minimum anchoring value is achieved during the expansion of the anchor within the borehole, stop 57a is sheared off the outer surface of sleeve 57 and that sleeve along with spacer sleeve 56 can be displaced forwardly into the counterbore 33c in the second end of the fastening element. The deformation resistance of the annular projection 59 is relatively low compared to the force required for shearing off stop 57a.

To afford a visual indication of the state of the anchoring operation, the spacer sleeves 39 in FIGS. 5 and 6 and 56 in FIG. 7 can also be provided with a conspicuous color scheme so that the observation of these sleeves can be easily effected.

While specific embodiments of the invention have been shown and described in detail to illustrate the application of the inventive principles, it will be understood that the invention may be embodied otherwise without departing from such principles.

What is claimed is:

1. An expansion anchor assembly insertable into a borehole in a support structure for securing a member to the support structure, said anchor comprising an axially elongated first part having a first end and a second end with the second end arranged to be positioned exteriorily of the borehole and having a shoulder thereon at least adjacent the second end for use in securing the member to the support structure and the first end arranged to be positioned interiorly within the borehole, said first part being threaded for at least a portion of its axial length, an axially elongated second part having a first end and a second end with the first end projecting outwardly beyond the first end of said first part so that it is arranged to project further into the borehole and said second part being threaded in the axial direction adjacent the second end thereof and being in threaded engagement with said first part, a third part having a first end and a second end and the second end of said third part connected to the first end of said second part and projecting axially outwardly therefrom so that it is arranged to project therefrom further into the borehole, said third part being threaded in the axial direction thereof from the first end toward the second end thereof, a spreader in threaded engagement with said third part, an axially elongated expansion sleeve having a first end and a second end with said sleeve laterally enclosing at least a portion of said third part and arranged to be expanded radially by said spreader, means for interconnecting said first part and said second part so that said second part can be rotated about its elongated axis by said first part and said means providing automatic disengagement of the interconnection between said first part and said second part when a minimum anchoring value is achieved as said third part connected to said second part pulls said spreader into said expansion sleeve and expands it radially outwardly into engagement with the borehole in the support structure, wherein the improvement comprises that said means interconnecting said first and second parts is located intermediate the second end of said expansion sleeve and the shoulder on said first part and said first part being rotatable about its elongated axis relative to said second part upon the automatic disengagement of said means so that said first part can be threaded into said second part for axial movement relative thereto permitting movement of said shoulder toward the second end of said second part, and when the member is secured to the support structure by said first part said means is completely enclosed and covered between the shoulder on said first part and second part.

2. An expansion anchor assembly, as set forth in claim 1, wherein said means interconnecting said first and second parts is mounted on one of said first and second parts and includes a stop disposed in contact with the other one of said first and second parts at least while the rotation transmitting interconnection is provided between said first and second parts.

3. An expansion anchor assembly, as set forth in claim 2, wherein said first part is a threaded bolt, said second part includes an interiorly threaded sleeve-like portion into which said bolt is threaded, and said interconnecting means is mounted in said sleeve-like portion traversing the path of said bolt therethrough.

4. An expansion anchor assembly, as set forth in claim 2, wherein said first part is a threaded bolt, said second part includes an interiorly threaded sleeve-like portion into which said bolt is threaded, and said interconnecting means comprises at least one sleeve laterally enclosing said bolt adjacent the second end of said sleeve, said sleeve having a first end and a second end with the first end contacting the second end of said sleeve-like portion and the second end contacting the shoulder on said bolt, and said sleeve including a stop formed on and extending outwardly from said sleeve and disposed in contact with the second end of said second part.

5. An expansion anchor assembly, as set forth in claim 4, wherein said stop has a preset breaking point.

6. An expansion anchor assembly, as set forth in claim 3, wherein said interconnecting means comprises a shearing pin mounted in said sleeve-like portion and extending across the path of said bolt and disposed in contact with said bolt.

7. An expansion anchor assembly, as set forth in claim 4, wherein said stop comprises an annularly shaped collar formed on the radially outer surface of said sleeve.

8. An expansion anchor assembly, as set forth in claim 3, wherein said interconnecting means comprises an inwardly projecting shoulder formed in the inner surface of said sleeve-like portion of said second part with said shoulder located intermediate the first and second ends of said second part, and a disc positioned within said sleeve-like portion abutting against said shoulder on the side thereof closer to the second end of said second part and said disc extending across the path of said bolt and disposed in contact with said bolt.

9. An expansion anchor assembly, as set forth in claim 3, wherein a washer is provided extending around said bolt for limiting the depth of insertion of the assembly into the borehole, and a spacer element laterally enclosing said bolt radially inwardly of said washer and extending between said washer and said shoulder on said bolt.

10. An expansion anchor assembly, as set forth in claim 9, wherein at least one additional sleeve-like member is provided laterally enclosing said bolt and located between the end of said spacer sleeve remote from said shoulder on said bolt and the second end of said second part.

11. An expansion anchor assembly, as set forth in claim 9, wherein the outer surface of said spacer sleeve is disposed in contact with the opening through said washer and said spacer sleeve being displaceable relative to said washer at least when said interconnecting means is disengaged.

12. An expansion anchor assembly, as set forth in claim 11, wherein said spacer sleeve is provided with a conspicuous color scheme.

13. An expansion anchor assembly, as set forth in claim 4, wherein said stop comprises a ring-shaped member formed integrally with said sleeve and being displaceable from said sleeve when said interconnecting means is disengaged.

14. An expansion anchor assembly, as set forth in claim 1, wherein a ring-shaped elastic element is provided laterally enclosing the second end of said expansion sleeve and disposed in contact with the first end of said second part and said element maintaining the second end of said expansion sleeve and the first end of said second part in spaced relation.

15. An expansion anchor assembly insertable into a borehole in a support structure for securing a member to the support structure, said anchor assembly comprising an axially elongated first part having a first end and a second end with the second end arranged in a position exteriorly of the borehole and having a shoulder thereon at least adjacent the second end for use in securing the member to the support structure, and the first end arranged to be positioned interior within the borehole, said first part being theaded for at least a portion of its axial length, an axially elongated second part having a first end and a second end with the first end projecting outwardly beyond the first end of said first part so that it is arranged to project further into the borehole and said second part being threaded in the axial direction adjacent the second end thereof and being in threaded engagement with said first part, an axially elongated third part having a first end and a second end and the second end of said third part connected to the first end of said second part and projecting axially outwardly therefrom so that it is arranged to project further into the borehole, said third part being threaded in the axial direction thereof from the first end toward the second end thereof, a spreader in threaded engagement with said third part, an axially elongated expansion sleeve having a first end and a second end with said sleeve laterally enclosing at least a portion of said third part and arranged to be expanded radially outwardly by said spreader, means for interconnecting said first part and said second part so that said second part can be rotated about its elongated axis by said first part and said means providing automatic disengagement between said first and second parts when a minimum anchoring value is achieved as said third part connected to said second part pulls said spreader into said expansion sleeve and expands it radially outwardly into engagement with the borehole in the support structure, wherein the improvement comprises that said means interconnecting said first and second parts is located intermediate the first end of said second part and the shoulder on said first part and said first part being rotatable about its elongated axis relative to said second part upon the automatic disengagement of said means so that said first part can be threaded into said second part for axial movement relative thereto permitting movement of said shoulder toward the second end of said second part, and when said member is secured to the support structure by said first part said means is completely enclosed and covered between the shoulder on said first part and said second part.

16. An expansion anchor assembly, as set forth in claim 15, wherein said means interconnecting said first and second parts is mounted on one of said first and second parts and includes a stop disposed in contact with the other one of said first and second parts at least while the rotation transmitting interconnection is provided between said first and second parts.

17. An expansion anchor assembly, as set forth in claim 16, wherein said first part is a threaded bolt, said second part includes an interiorly threaded sleeve-like portion into which said bolt is threaded, and said interconnecting means is mounted in said sleeve-like portion traversing the path of said bolt therethrough.

18. An expansion anchor assembly, as set forth in claim 16, wherein said first part is a threaded bolt, said second part includes an interiorly threaded sleeve-like portion into which said bolt is threaded, and said interconnecting means comprises at least one sleeve laterally enclosing said bolt adjacent the second end of said sleeve-like portion, said sleeve having a first end and a second end with the first end contacting the second end of said sleeve-like portion and the second end contacting the shoulder on said bolt, and said sleeve including a stop formed on and extending outwardly from said sleeve and disposed in contact with the second end of said second part.

19. An expansion anchor assembly, as set forth in claim 18, wherein said stop has a preset breaking point.

20. An expansion anchor assembly, as set forth in claim 17, wherein said interconnecting means comprises a shearing pin mounted within said sleeve-like portion and extending across the path of said bolt and disposed in contact with the first end of said bolt.

21. An expansion anchor assembly, as set forth in claim 18, wherein said stop comprises an annularly shaped collar formed on the radially outer surface of said sleeve.

22. An expansion anchor assembly, as set forth in claim 17, wherein said interconnecting means comprises an inwardly projecting shoulder formed in the inner surface of said sleeve-like portion of said second part with said shoulder located intermediate the first and second ends of said second part, and a disc positioned within said sleeve-like portion abutting against said shoulder on the side thereof closer to the second end of said second part and said disc extending across the path of said bolt and disposed in contact with the first end of said bolt.

23. An expansion anchor assembly, as set forth in claim 18, wherein a washer is provided extending around said bolt for limiting the depth of insertion of the assembly into the borehole, and a spacer element laterally enclosing said bolt radially inwardly of said washer and extending between said washer and said shoulder on said bolt.

24. An expansion anchor assembly, as set forth in claim 23, wherein at least one additional sleeve-like member is provided laterally enclosing said bolt and located between the end of said spacer sleeve remote from said shoulder on said bolt and the second end of said second part.

25. An expansion anchor assembly, as set forth in claim 24, wherein the outer surface of said spacer sleeve is disposed in contact with the opening through said washer and said spacer sleeve being displaceable relative to said washer at least when said interconnecting means is disengaged.

26. An expansion anchor assembly, as set forth in claim 25, wherein said spacer sleeve is provided with a conspicuous color scheme.

27. An expansion anchor assembly, as set forth in claim 23, wherein said stop comprises a ring-shaped member formed integrally with said sleeve and being displaceable from said sleeve when said interconnecting means is disengaged.

28. An expansion anchor assembly, as set forth in claim 15, wherein a ring-shaped elastic element is provided laterally enclosing the second end of said expansion sleeve and disposed in contact with the first end of said second part and said element maintaining the second end of said expansion sleeve and the first end of said second part in spaced relation.

29. An expansion anchor assembly insertable into a borehole in a support structure for securing a member to the support structure, said anchor assembly comprising an axially elongated first part having a first end and a second end with the second end arranged to be positioned exteriorly of the borehole and having a shoulder thereon at least adjacent the second end for use in securing the member to the support structure and the first end arranged to be positioned interiorly within the borehole, said first part being threaded for at least a portion of its axial length, and at least one axially elongated second part having a first end and a second end with the first end projecting outwardly beyond the first end of said first part so that it is arranged to project further into the borehole and said second part being threaded in the axial direction adjacent the second end thereof and being in threaded engagement with said first part, a spreader in threaded engagement with said at least one said second threaded part, an axially elongated expansion sleeve having a first end and a second end with said sleeve laterally enclosing at least a part of said at least one said second part and arranged to be expanded radially outwardly by said spreader, means forming an interconnection between said first and said at least one second part so that said second part can be rotated about its elongated axis by said first part, and said means providing automatic disengagement between said first part and said at least one second part when a minimum anchoring value is achieved as said spreader radially displaces said expansion sleeve outwardly into engagement with the borehole and the support structure, wherein the improvement comprises that said means disengageably interconnecting said first part and said at least one second part includes sleeve-like parts extending between the shoulder on said first part and said expanding sleeve and said first part being rotatable about its elongated axis relative to said second part upon the automatic disengagement of said means so that said first part can be threaded into said second part for axial movement relative thereto permitting movement of said shoulder toward the second end of said second part, said spreader and said expanding sleeve having corresponding frusto-conically shaped surfaces permitting self-locking therebetween, and when the member is secured to the support structure said interconnecting means is completely enclosed between the shoulder on said first part and the adjacent second end of said at least one second part and is completely covered thereby.

30. An expansion anchor assembly, as set forth in claim 29, wherein said means interconnecting said first and second parts is mounted on one of said first and second parts and includes a stop disposed in contact with the other one of said first and second parts at least while the rotation transmitting interconnection is provided between said first and second parts.

31. An expansion anchor assembly, as set forth in claim 30, wherein said first part is a threaded bolt, said second part includes an interiorly threaded sleeve-like portion into which said bolt is threaded, and said interconnecting means is mounted in said sleeve-like portion traversing the path of said bolt therethrough.

32. An expansion anchor assembly, as set forth in claim 30, wherein said first part is a threaded bolt, said second part includes an interiorly threaded sleeve-like portion into which said bolt is threaded, and said interconnecting means comprises at least one sleeve laterally enclosing said bolt adjacent the second end of said sleeve-like portion, said sleeve having a first end and a second end with the first end contacting the second end of said sleeve-like portion and the second end contacting the shoulder on said bolt, and said sleeve including a stop formed on and extending radially outwardly from said sleeve and disposed in contact with the second end of said second part.

33. An expansion anchor assembly, as set forth in claim 32, wherein said stop has a preset breaking point.

34. An expansion anchor assembly, as set forth in claim 32, wherein said stop comprises an annularly shaped collar formed on the radially outer surface of said sleeve.

35. An expansion anchor assembly, as set forth in claim 32, wherein a washer is provided extending around said bolt for limiting the depth of insertion of the assembly into the borehole, and a spacer element laterally enclosing said bolt radially inwardly of said washer and extending between said washer and said shoulder on said bolt.

36. An expansion anchor assembly, as set forth in claim 35, wherein at least one additional sleeve-like member is provided laterally enclosing said bolt and located between the end of said spacer sleeve remote from said shoulder on said bolt and the second end of said second part.

37. An expansion anchor assembly, as set forth in claim 35, wherein the outer surface of said spacer sleeve is disposed in contact with the opening through said washer and said spacer sleeve being displaceable relative to said washer at least when said interconnecting means is disengaged.

38. An expansion anchor assembly, as set forth in claim 37, wherein said spacer sleeve is provided with a conspicuous color scheme.

39. An expansion anchor assembly, as set forth in claim 35, wherein said stop comprises a ring-shaped member formed integrally with said sleeve and being displaceable from said sleeve when said interconnecting means is disengaged.

40. An expansion anchor assembly, as set forth in claim 29, wherein a ring-shaped elastic element is provided laterally enclosing the second end of said expansion sleeve and disposed in contact with the first end of said second part and said element maintaining the second end of said expansion sleeve and the first end of said second part in spaced relation.

* * * * *